United States Patent

[11] 3,625,257

| [72] | Inventor | Harry J. Schroeder |
| | | Racine, Wis. |
| [21] | Appl. No. | 54,886 |
| [22] | Filed | July 15, 1970 |
| [45] | Patented | Dec. 7, 1971 |
| [73] | Assignee | Modine Manufacturing Company |

[54] FLUID FLOW TUBE
5 Claims, 9 Drawing Figs.

[52] U.S. Cl. ..................... 138/109,
138/115, 138/178, 165/164
[51] Int. Cl. ..................... F16l 9/18,
F16l 9/02
[50] Field of Search ..................... 138/109,
115, 178, 148; 165/164, 172

[56] References Cited
UNITED STATES PATENTS

| 2,214,053 | 9/1940 | Grimm | 165/164 X |
| 2,347,957 | 5/1944 | McCullough | 165/172 X |
| 3,173,196 | 3/1965 | Grimm | 138/148 X |
| 3,201,861 | 8/1965 | Fromson et al. | 138/148 X |
| 3,449,937 | 6/1969 | Dimmig | 138/109 X |

Primary Examiner—Herbert F. Ross
Attorney—Hofgren, Wegner, Allen, Stellman & McCord ABSTRACT: A fluid flow tube of a plastically deformable metal such as aluminum, brass, copper and the like of generally oval cross section and divided by one or more integral longitudinal walls or ribs into a plurality of parallel fluid flow passages in which an end of the tube is formed to circular cross section with a smooth interior to provide an attachment for fittings in which the rib or ribs and internal fins where used are blended into the sidewall to comprise integral structurally indiscernible reinforcing parts of the wall of this tube end.

PATENTED DEC 7 1971 3,625,257

INVENTOR.
HARRY J. SCHROEDER
BY Hofgren, Wegner, Allen, Stellman & McCord
ATTORNEYS.

FLUID FLOW TUBE

SUMMARY OF THE INVENTION

One of the features of this invention is to provide a fluid flow tube of oval cross section provided with one or more longitudinally extending partitions or ribs dividing the tube into a plurality of flow passages in which one end of the tube is shaped to provide a fitting when the lateral dimension of the end is enlarged as by reshaping to a circular cross section and in which the internal ribs and fins or the like where present are blended into the sidewall of the end for integral strengthening reinforcing effect.

Other features and advantages of the invention will be apparent from the following description of one embodiment thereof.

DESCRIPTION OF THE PREFERRED EMBODIMENT

Figure 1:
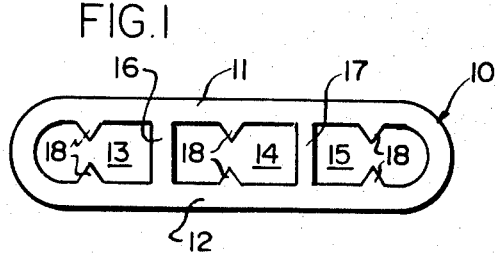
FIG. 1 is an end view of an oval metal tube prior to being reshaped and reformed to embody the invention.

In the embodiment illustrated in FIGS. 1–6 the fluid flow tube 10 of generally oval cross section has parallel top 11 and bottom 12 webs with the interior being separated into three parallel fluid flow passages 13, 14 and 15 by a pair of spaced longitudinal dividing walls or ribs 16 and 17. In the embodiment illustrated the tube 10 in each of the passages 13, 14 and 15 is also provided with a pair of oppositely located heat transfer fins 18.

It is of course necessary in connecting the tube 10 for flow of fluid therethrough to provide end connections for the tube. It has been discovered that much more secure fittings can be used and the tube simultaneously strengthened by providing the structure of this invention. This is accomplished as follows.

Figure 2:
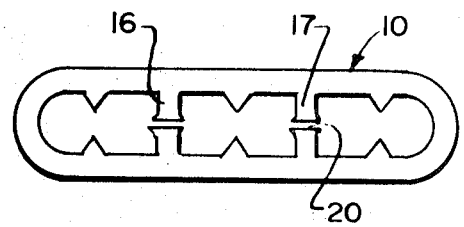
FIG. 2 is a view similar to FIG. 1 but illustrating the appearance of the tube after the internal ribs that divide the tube into three parallel passages have been slit.
Figure 3:
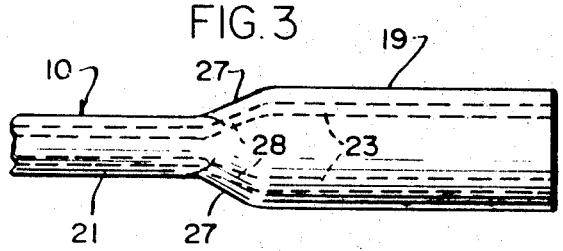
FIGS. 3 and 4 are side elevational and end views, respectively, of the tube of FIG. 2 after it has been reshaped to a generally circular cross section.
Figure 4:
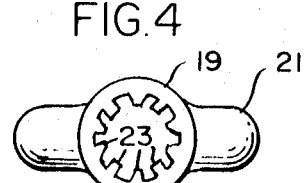

At the end of the tube 10 the ends of the ribs 16 and 17 are slit as shown at 20 in FIG. 2. The tube end 19 is then reshaped into a circular cross section or cylindrical configuration as shown in FIGS. 3 and 4. In doing so the lateral dimension of the tube which in the illustrated embodiment is the vertical diameter is enlarged in the corresponding dimension of the adjacent oval cross section tube portion 21. This circular end portion 19 contains on its interior the ribs 18 and the remnants of the slit ribs 16 and 17.

Figure 5:
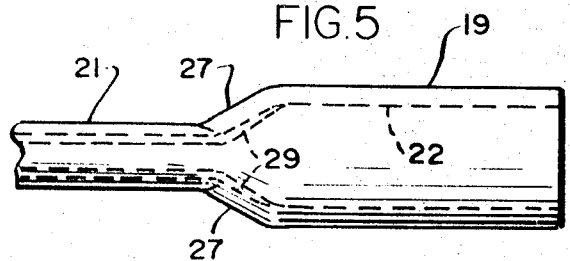
FIGS. 5 and 6 are similar side elevational and end views of the tube of FIGS. 3 and 4 after the internal fins and severed ribs have been plastically worked to blend into the tube wall to provide the smooth interior passage shown.
Figure 6:
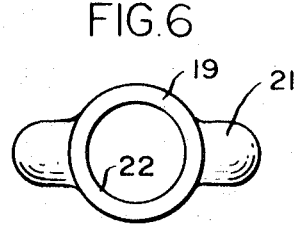

In the next step, as illustrated in FIGS. 5 and 6, the interior 22 of the tube end 19 is provided with a smooth-flow-promoting cylindrical surface as illustrated in FIG. 6 in which the former projections 23 that are made up of the fins 18 and rib 16 and 17 remnants as described are plastically worked or deformed into the tube wall so that not only is the smooth-flow-promoting interior produced but these portions tend to thicken and reinforce the tube end portion 19.

The result is that the tube end portion 19 is not only strengthened but the projections 23 which are plastically deformed into the sidewall that comprises the tube end 19 become an integral structurally indiscernible reinforcing part of the tube end portion 19.

Figure 7:
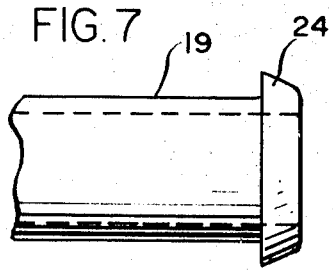
FIGS. 7, 8 and 9 are end elevational views of three different types of end fittings each integral with the tube end and each formed in a subsequent step.
Figure 8:
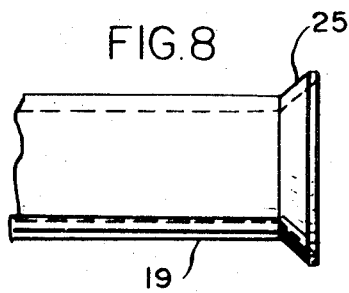
Figure 9:
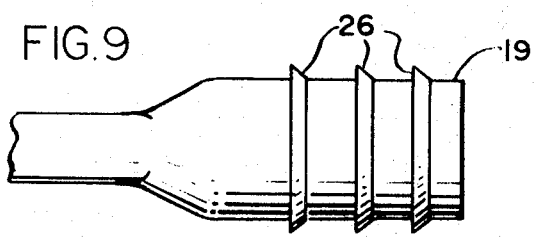

The end 19 of the plastically deformable metal tube is also shaped into fittings which aid in achieving fluidtight joints with connecting structures (not shown) regardless of whether the fluid being transferred through the tube is a gas or liquid. FIGS. 7–9 illustrate three different types of integral fittings with the fitting of FIG. 7 being an integral end annular projecting ring 24, the fitting of FIG. 8 being a similar but differently shaped ring 25 and the fitting of FIG. 9 being three such rings 26 longitudinally spaced-apart. It is of course apparent to those skilled in the art that the shape of the fitting that is used can be varied as desired.

In the tube of this invention the principal portion which is the oval tube portion 21 remains unchanged. It is only the end portion 19 that is strengthened and reformed.

As is shown in FIGS. 3 and 5 the end portion 19 which in this embodiment is of circular cross section is joined to the oval cross section tube portion 21 by upper and lower sloped shoulders 27. The interior projections 23 are similarly sloped prior to the final reforming as indicated at 28 in FIG. 3. After the plastic deformation smoothing of the interior 22 of the tube as shown in FIGS. 5 and 6 the remnants of these projections 23 as identified at 29 in FIG. 5 are also sloped so as to provide interior reinforcements at the shoulders 27 that join the oval tube portion 21 to the circular tube end portion 19. Because of the change in dimension at these shoulders 27 there are considerable stresses built up here and these remnant portions 29 serve to reinforce the tube at the precise areas where these stresses are developed.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A fluid flow tube having walls of plastically deformable metal, comprising: an intermediate portion of the tube of oval cross section with major and minor transverse axes, said intermediate portion having at least one integral longitudinal rib therein dividing said intermediate portion into a plurality of side-by-side unconnected fluid passages; and an end portion of said tube comprising an extension of said rib containing intermediate portion, the tube wall of said end portion having a dimension parallel to said minor axis that is greater than said minor axis, the end portion being connected to said intermediate portion by a sloped connecting part, said tube having an integral longitudinal fin extending inwardly in each of said fluid passages of said intermediate portion and plastically deformed into said end portion sidewall in the same manner as said rib, said end portion having a smooth interior with its said rib plastically deformed into its sidewall to comprise an integral, structurally indiscernible, reinforcing part thereof.

2. The tube of claim 1 wherein said end portion is of circular cross section and is coaxial with said intermediate portion.

3. The tube of claim 1 wherein said sloped connecting part contains a sloped remnant of said rib as a reinforcement of said sloped part.

4. The tube of claim 3 wherein said end portion is of circular cross section and is coaxial with said intermediate portion.

5. The tube of claim 4 wherein said tube further comprises an integral longitudinal fin extending inwardly in said intermediate portion and plastically deformed into said end portion sidewall in the same manner as said rib and said sloped connecting part contains a sloped remnant of said rib as a reinforcement of said sloped part.

* * * * *